US007076658B2

(12) United States Patent
O Neill

(10) Patent No.: US 7,076,658 B2
(45) Date of Patent: Jul. 11, 2006

(54) METHOD AND SYSTEM FOR THE SIMULTANEOUS PROCESSING OF DOCUMENT STRUCTURE AND ELECTRONIC SIGNATURE FOR ELECTRONIC DOCUMENTS

(75) Inventor: Mark O Neill, Dublin (IE)

(73) Assignee: Vordel Limited, Dublin (IE)

( * ) Notice: Subject to any disclaimer, the term of this patent is extended or adjusted under 35 U.S.C. 154(b) by 866 days.

(21) Appl. No.: 10/047,954

(22) Filed: Jan. 15, 2002

(65) Prior Publication Data

US 2003/0093677 A1 May 15, 2003

(30) Foreign Application Priority Data

Dec. 14, 2001 (EP) .................................. 01650150

(51) Int. Cl.
G06F 21/22 (2006.01)
G06F 21/24 (2006.01)
G06F 7/02 (2006.01)
H04L 9/36 (2006.01)

(52) U.S. Cl. ...................... 713/176; 713/180; 713/165; 726/30; 726/16; 705/57

(58) Field of Classification Search ................ 713/176, 713/156, 161, 180; 726/16, 30; 715/524; 714/49, 41
See application file for complete search history.

(56) References Cited

U.S. PATENT DOCUMENTS

| 5,404,520 | A |   | 4/1995  | Sonobe           |         |
|-----------|---|---|---------|------------------|---------|
| 5,848,400 | A | * | 12/1998 | Chang            | 705/35  |
| 5,903,721 | A |   | 5/1999  | Sixtus           |         |
| 5,958,050 | A | * | 9/1999  | Griffin et al.   | 713/200 |
| 6,021,202 | A | * | 2/2000  | Anderson et al.  | 705/54  |
| 6,021,491 | A | * | 2/2000  | Renaud           | 713/179 |
| 6,332,133 | B1| * | 12/2001 | Takayama         | 705/39  |
| 2002/0040431 | A1 | * | 4/2002 | Kato et al.      | 713/168 |

* cited by examiner

Primary Examiner—Jacques H. Louis Jacques
Assistant Examiner—Thomas Szymanski
(74) Attorney, Agent, or Firm—Gregory M. Zinkl; Dykema Gossett PLLC

(57) ABSTRACT

A method and system for simultaneous and concurrent processing of parameters associated with an electronic document is described. The method comprises the sharing of a memory location between the processing steps that examine each of the parameters, such that if any parameter is marked as invalid, a termination of examination of the other parameters is effected.

16 Claims, 4 Drawing Sheets

METHOD AND SYSTEM FOR THE SIMULTANEOUS PROCESSING OF DOCUMENT STRUCTURE AND ELECTRONIC SIGNATURE FOR ELECTRONIC DOCUMENTS

FIELD OF THE INVENTION

The invention relates to the validation of documents, and in particular to a system and method adapted to effect the simultaneous processing of document structure and digital signature of an electronic document. Within the present specification, it will be understood that the term document is intended to cover any type of electronic object such as but not limited to text, source code, object code, binaries, images etc.

BACKGROUND OF THE INVENTION

Digital Signature verification is a well-defined process which is implemented according to internationally-defined specifications. These are detailed in Section 2.1 below. Digital Certificate validation, however, can be implemented using a number of different mechanisms. Examples of these are documented in Section 2.2 and its associated sub-sections below.

2.1 Digital Signature Verification

Digital signature verification makes use of mathematical cryptography in order to verify the integrity of a document and to associate a signer with a signed document. The mathematics used for digital signatures is sufficiently strong to render the generation of a fraudulent signature mathematically infeasible.

The following sub-sections define, at a technical level, typical steps involved in digital signature verification.

1. A digest of the signed data is produced through the use of a cryptographic hashing function. A cryptographic hashing function is a one-way mathematical function which produces an output which is linked its input in such a way that an alternative input is highly unlikely to produce the same output. The output of a cryptographic hashing function is called a "hash" and it is generally shorter in length than the corresponding input. Examples of hashing algorithms include SHA-1 and MD-5. It is important that the data is hashed using the same data hashing function as that used by the sender.

2. The recipient uses the customer's public key to decrypt the signature and the hash.

3. If the two hashes—the hash that was encrypted by the signer and the hash produced by the recipient—are identical, then the integrity of the data is validated.

The process described in these three steps is mathematical and is independent of the Digital Certificate Processing stage described in Section 2.1 below.

2.2 Digital Certificate Processing

A digital certificate is a digital document that verifies the identity of a person or entity. The digital certificate contains what is termed the signer's public key. This public key is part of a key pair which consists of both a public key and a private key. These two keys are uniquely linked. The private key is used to digitally sign an electronic document, and the public key (contained in or referenced by a digital certificate) is used to verify the digital signature. In both cases—signature generation and signature validation—the same underlying asymmetric key cryptography is used. Further details are found in U.S. Pat. No. 4,405,829.

As well as a public key, digital certificates contain information that relates to the entity to which the certificate is linked. This information may be stored in a structured format, and some digital certificates conform to a standard, X.509, for the storage of this identification information. When a digitally signed electronic document is received, the digital signature may include a digital certificate. This digital certificate may be checked for validity. A digital certificate is marked invalid if the unique relationship of the public and private key pair to the signer comes into doubt. An example of a digital certificate's validity being in doubt is a compromise of the confidentiality of a private key pass-phrase. This means that the signer is no longer the only person who could sign documents with that private key.

In addition, a digital certificate may be invalid if the recipient does not trust the sender, or does not trust the Certificate Authority which issued their digital certificate. The sender is identified by their Digital Certificate. A Digital Certificate may contain a reference to the Certificate Authority which issued the certificate. This Certificate Authority may not be trusted by the document recipient.

A Digital Certificate may be revoked, meaning that the certificate is registered as being no longer valid, using a third party certificate store that is available over a computer network. Because of this reliance on an online certificate registry, generally implemented using the X.500 directory protocol, the certificate validation stage typically requires a network connection, although it will be appreciated that it may be implemented on the same machine.

Different techniques are known for certificate validation, examples of which are described in sections 2.2.1 to 2.2.3 below.

2.2.1 Certificate Revocation List (CRL)

A Certificate Revocation List (CRL) is an electronic listing of invalid and revoked certificates. This list is generally stored in a hierarchical directory conforming to the X.500 standard. The list is generally checked using the LDAP (Lightweight Directory Access Protocol) protocol.

2.2.2 Online Certificate Status Protocol (OCSP)

OCSP is used to verify the status of a digital certificate. OCSP operates by checking multiple Certificate Revocation Lists (see above) and storing the results. The act of checking a single OCSP Responder is therefore more efficient than checking multiple Certificate Revocation Lists sequentially.

2.2.3 extensible Key Management Protocol (XKMS)

XKMS specifies protocols for distributing and registering public keys, suitable for use in conjunction with the proposed XML Signature recommendation [XML-DSIG] developed jointly by the World Wide Web Consortium (W3C) and the Internet Engineering Task Force (IETF). The XML Key Management Specification (XKMS) comprises two parts—the XML Key Information Service Specification (X-KISS) and the XML Key Registration Service Specification (X-KRSS).

The X-KISS specification defines a protocol for a Trust service that resolves public key information contained in XML signature elements, as defined by the W3C and the IETF. The X-KISS protocol allows a client of such a service to delegate part or all of the tasks required to process XML certificate details contained within X509Certificate tags. The underlying certificate validity method may be one or other of (2.2.1) and (2.2.2) above.

2.2 Document Structure Validation

This process involves verifying an electronic document against a set of structural rules; the structural rules being rules pertaining to the document. An example of document structural rule is XML document validation—whereby a document must contain appropriately-formatted mark-up which must conform to certain structural rules—concerning ordering and nesting, for example.

2.4 Document Syntactic Verification

An electronic document is syntactically valid if it conforms to certain syntactic rules. For XML, these rules may be expressed in a document called a Document Type Definition (DTD). DTD documents contain rules concerning the specific mark-up tags that may be located in an XML document, their order, and their hierarchy.

FIG. 1 shows a traditional flow operation utilised in verification of signatures and certificates and also for checking a document structure validity. A document is received (step 100). Such retrieval, it will be appreciated, may comprise the receipt of a new document at a verification processor or a retrieval of a previously stored document from a datastore for subsequent verification and authentication. The digital signature is extracted from the document (Step 110), in accordance with known principles. On extraction from the document, the verification engine effects a connection to a third party service so as to effect a verification of the validity of the digital certificate (Step 120). The confirmation of the validity of the certificate, allows the processing to continue so as to effect a verification of the signature against the document (Step 130). Again, the specific operation of the steps will be well known to those skilled in the art.

Once the certificate and signature associated with a document have been verified then the actual structure of the document is checked (Step 140). This checking ensures that the identified document conforms to a set of structural rules consistent with that document type. The document may now be checked for syntactic validity which checks the document syntax within the identified document and confirms that the syntax conforms to a set of rules specific for syntax appropriate for that document type. In the case of an XML type document, the document structure will be checked against defined document structural rules for XML documents, whereas the syntactic validity is a check on the syntax used within the document against a document type definition specific for that XML type document.

It will be appreciated from the discussion above and the steps outlined in FIG. 1, that this known method for verifying a document requires a number of sequential steps. A specific sequential order of steps has been outlined for convenience of explanation and it will be appreciated that the order of the sequential steps may be changed without departing from the known methodology. If the document fails any of the tests listed above then the document is considered invalid. It will be appreciated that the document may proceed through any number of steps only to fail the final step. Such a failure at any one of the steps outlined in the verification process terminates the process and rejects the document. As such, the system of the prior art may have processed much of the information relating to the verification only to finally reject the document. If this occurs, processing time and resources have been wasted. There is, therefore, a need for a system and method that will allow for an improved processing of signatures associated with digital documents.

OBJECT OF THE INVENTION

It is an object of the present invention to provide an improved system and method for the processing of digitally-signed documents.

SUMMARY OF THE INVENTION

These needs and others are provided by the system and method of the present invention which provides for a concurrent processing of the associated parameters identified with a document.

Accordingly the present invention provides a method for the processing of digitally-signed documents, the method comprising the steps of:
a) Digital Certificate verification
b) Digital Signature validation
c) Document validity processing
and wherein steps a) to c) are processed in concurrent manner.

The invention additionally provides a method for marking an electronic document as a valid document comprising the steps of:
examining a digital signature associated with the document, examining the structure associated with the document, and wherein if the steps examining the digital signature and the structure associated with the document determine that the signature and structure are valid for that document then the document is marked as a valid document and if either of the steps of examining the digital signature or the structure determine that the digital signature or structure are not valid for that document, then the other of the steps of examining the digital signature or structure is terminated prior to concluding whether that step is valid, and the document is marked as an invalid document.

The step of examining the digital signature desirably compresses the steps of;
extracting a digital signature from the document,
determining whether the signature references a digital certificate and returning a valid response if the signature references a digital certificate,
on receiving a valid response from the determination of whether the signature references a certificate, determining whether the certificate is a valid certificate, and
on confirming that the signature references a certificate and the certificate is a valid certificate marking the signature as being validly confirmed.

The step of examining the digital signature desirably further includes the step of:
marking the signature as invalid if either of the steps of determining whether the signature references a certificate or the certificate is a valid certificate fails.

The marking of the signature as invalid typically comprises the step of flagging a shared memory location within a computer processor so as to effect a marking within the shared memory location that the examination of the signature has failed.

The step of examining the document structure typically comprises the steps of:
determining if the document is structurally valid, and
determining if the document is syntactically valid.

The steps of determining if the document is structurally valid or syntactically valid typically comprise the steps of:
extracting information from the document relating to the structure and syntax of the document, comparing the extracted information against a series of stored rules so as to determine whether the extracted information matches the stored information, and on determining that the extracted information matches the stored information marking the document as structurally valid.

On determination that the document is not structurally valid the method additionally provides for the steps of: flagging a shared memory location with a marker so as to identify that the structure has been found invalid.

The shared memory location is typically accessed during both of the steps of examining the signature and examining the document structure, the noting of a marked failure within the shared memory effecting a termination of the examination of the signature or the document structure.

The present invention also provides a computer system adapted for the concurrent processing of digitally signed document, the system comprising:

a signature verification module adapted to verify the signature associated with a document, a document structure verification module adapted to verify the structure of a document, and a state processor, wherein both the signature verification module and the document structure verification module interface with the state processor during verification of the signature and verification of the document structure, and wherein the state processor is adapted in response to a verification failure of either the signature or structure to flag the failure and wherein the signature verification module and the document structure verification module are adapted to terminate verification upon detection of the failure flag arising from the failure of the other verification process.

These and other features of the present invention will be better understood with reference to the following drawings.

DETAILED DESCRIPTION OF THE DRAWINGS

Figure 1:
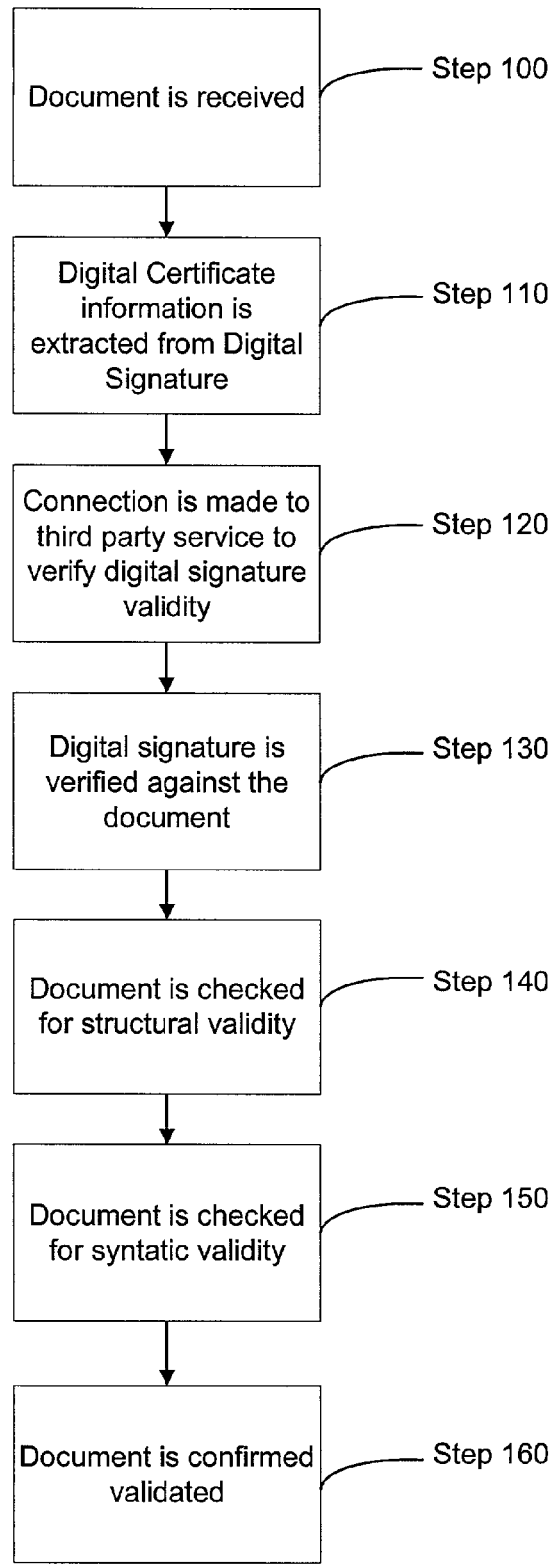
FIG. 1 shows a method according to the prior art, whereby document signature processing and document verification processing are performed in a sequential manner.

FIG. 1 has been described with reference to the prior art wherein document structure and syntax validation, and electronic signature validation are performed sequentially. As detailed above, this has the disadvantage that if a later stage of processing produces a negative result, the time spend on earlier stages will have been used inefficiently.

Figure 2:
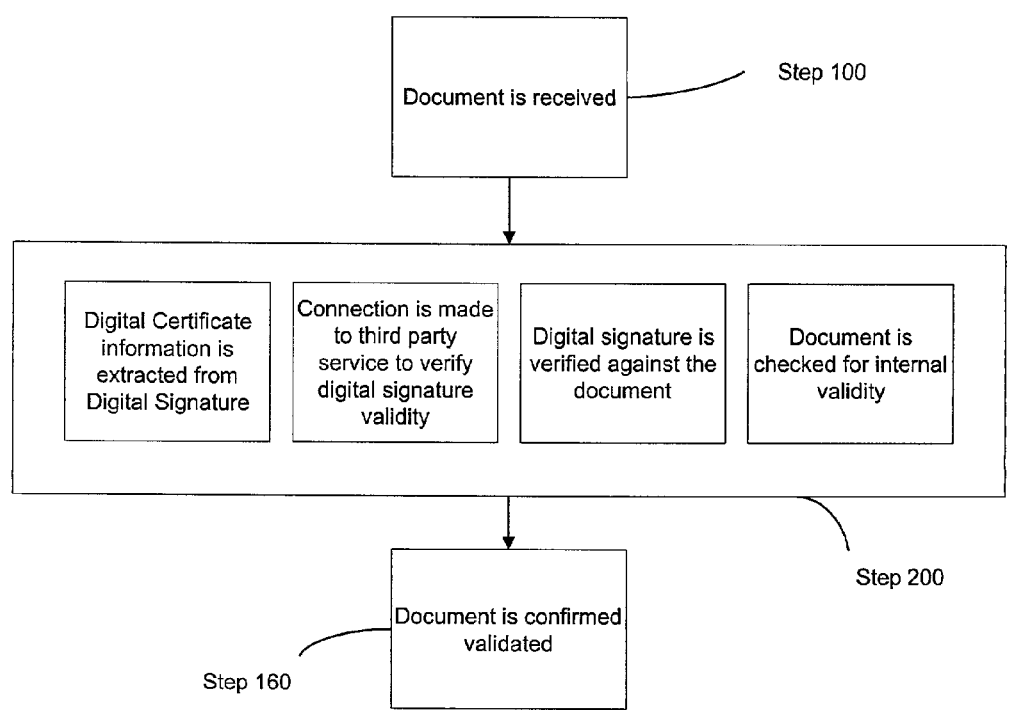
FIG. 2 shows a method according to the present invention whereby the document signature processing and document verification processing are performed in a concurrent manner.

FIG. 2 shows a method according to the present invention. The same reference numerals are used for similar tasks. A document is received for verification in a similar manner to that previously described (Step 100). The present invention provides a single process (Step 200) for concurrent processing of the previously described sequential operations for verifying the signature, certificate and structure of the document. These multiple operations are achieved, in this exemplary embodiment of the present invention, by implementing multiple threads within a single process or program. It will be understood by those skilled in the art that a thread is similar to a program in that it has a beginning, a sequence and an end and at any given time during the runtime of the thread, there is a single point of execution. However, a thread itself is not a program in that it cannot run by itself, and it run within a program. A thread is sometimes considered a lightweight process as it runs within the context of a program and takes advantage of the resources allocated for that program and the program's environment.

Once the document has been verified to a satisfactory degree, the operation proceeds to confirm that the document is a valid document (Step 160).

Figure 3:
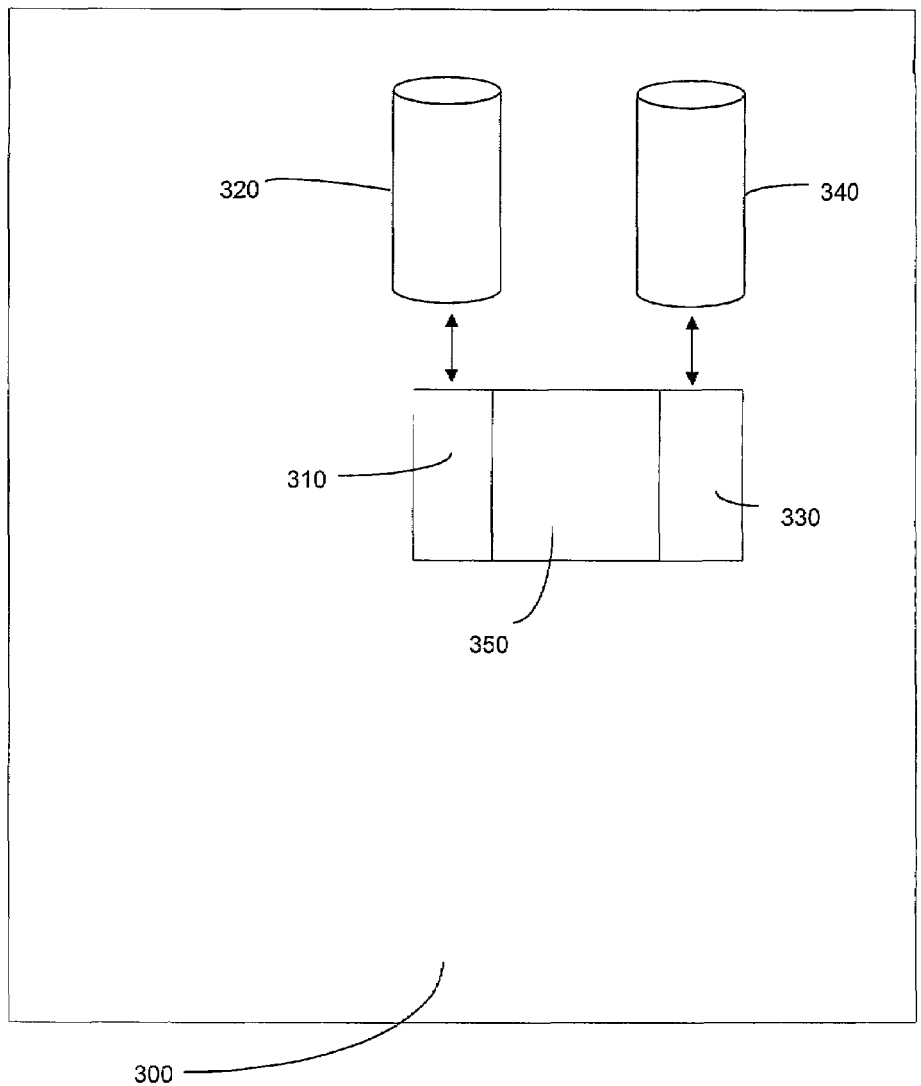
FIG. 3 is a schematic of a system architecture according to first embodiment of the present invention.

FIG. 3 shows a system architecture according to the present invention which may be used to implement the concurrent processing of individual verification modules according to the present invention. It will be appreciated that standard system components such as an input/output (I/O) have not been incorporated into this schematic for ease of explanation. The system 300 comprises a signature and certificate verification module comprising a signature/certificate verification processor 310 which is interfaceable with a stored set of rules 320, which may be used to implement the verification steps. Similarly, a structure verification module includes a structure verification processor 330 which may interface with a stored set of rules 340 relevant to the document structure. When processing the document for verification of the structure and the signature/certificate associated with the document, each of the processors 310, 330 interface with a shared memory location or state processor 350 which may be flagged to indicate the success or otherwise of the verification process.

The state processor typically comprises a flag which is accessed by each of the verification processes or threads. The state processor is typically marked initially with a counter to indicate that the verification process has not yet been marked failed. Threads of execution are used in order to perform the verification processing tasks concurrently. By enabling communication between the two verification modules, each processing a specific thread related to its verification, using this shared memory location 350, it is possible to effect a concurrent processing of the parameters associated with the document.

This interface is typically effected by means of a semaphore or mutex. Semaphores and mutexes are implemented by assigning a counter to a shared memory location, which is readable by all of the threads who rely on that semaphore or mutex. The monitoring of this memory location by all the threads ensures that they receive almost instant notification of a failure of document or digital signature verification by any one of the threads.

It will be appreciated that the implementation of threads using shared memory resources is typically achievable using most operating systems. The shared memory location 350 is updated or referenced constantly by all threads. It will be appreciated that this is not in effect a write/read operation to a memory location, rather a concurrent use of the same memory location.

Figure 4:
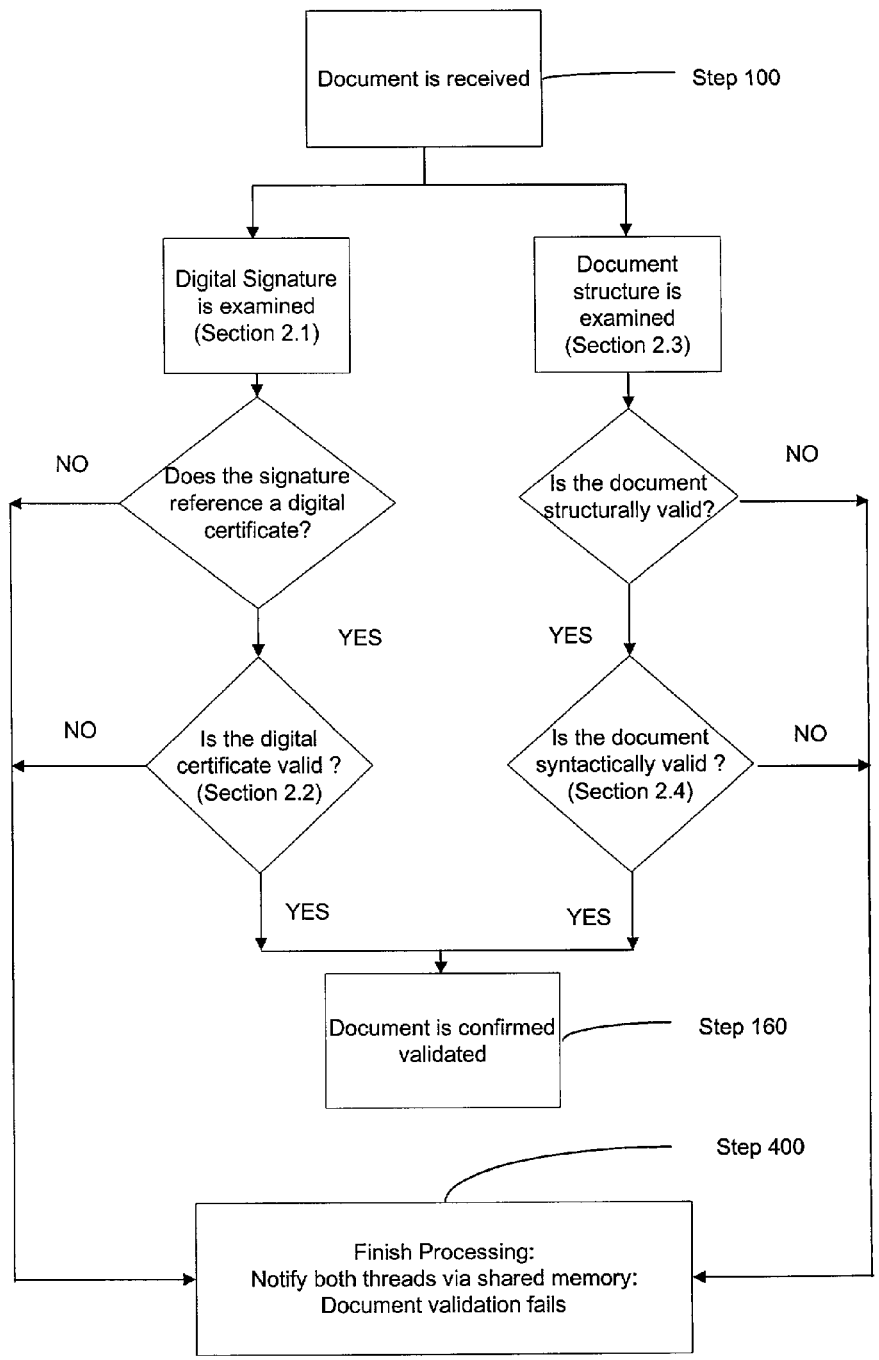
FIG. 4 is a process flow illustrating the interface between different threads processing different information according to the present invention.

FIG. 4 shows an implementation of the concurrent processing of the document structure/certificate/signature using the system of the present invention. The actions previously detailed in Sections 2.1 to 2.4 above are implemented to run concurrently rather than sequentially. The actions will run as separate threads within a single process, but each decision within the individual threads may be used to notify the other thread of a failure so as to terminate the thread. In the illustrated example four decision boxes are identified and it will be apparent to the skilled person that using multiple threads that interface with each other using the shared memory 350, that notification of a failed verification from any one of the four decision boxes may be used to notify any other of the decision modules prior to completion of the thread. This use of multiple threads within a single process, rather than implementing the actions as multiple processes, provides a lightweight implementation which avoids the overhead involved in initiating separate processes for each action.

Implementation of concurrent document validation means that if the document or digital certificate fails any of the checks then the processing is terminated. This contrasts with the sequential operation whereby the initial validation steps would have been performed in vain if the document fails a later test. This has speed and efficiency benefits.

The system of the present invention has been illustrated using the example of an integral architecture wherein the processor modules and the shared memory location are co-locatable. It will be appreciated by those skilled in the art that various modifications to the illustrated example may be implemented. For example the shared memory location may not be co-locatable but rather would take the form of a resource accessible over a local or wide area network such as but not limited to a Virtual Private Network, the internet etc. It will be appreciated that this resource can take many forms such as, but not limited to, a shared file.

The words "comprises/comprising" and the words "having/including" when used herein with reference to the present invention are used to specify the presence of stated features, integers, steps or components but does not preclude the presence or addition of one or more other features, integers, steps, components or groups thereof.

The invention claimed is:

1. A method for marking an electronic document as a valid document comprising the steps of: a) examining a digital signature associated with the document, and concurrently b) examining the structure associated with the document, and wherein if the steps examining the digital signature and the structure associated with the document determine that the signature and structure are valid for that document then the document is marked as a valid document, and if either of the steps of examining the digital signature or the structure determine that the digital signature or structure are not valid for that document, then the other of the steps of examining the digital signature or structure is terminated prior to concluding whether that step is valid, and the document is marked as an invalid document.

2. The method as claimed in claim 1 wherein the step of examining the digital signature comprises the steps of: a) extracting a digital signature from the document, b) determining whether the signature references a digital certificate and returning a valid response if the signature references a digital certificate, and if the signature does not reference a digital certificate terminating the examination of the signature and structure.

3. The method as claimed in claim 2 further comprising the steps of: a) on receiving a valid response from the determination of whether the signature references a certificate, determining whether the certificate is a valid certificate, and b) on confirming that the signature references a certificate and the certificate is a valid certificate marking the signature as being validly confirmed.

4. The method as claimed in claim 3 wherein the step of examining the digital signature further includes the step of:

a) marking the signature as invalid if the step of determining whether the certificate is a valid certificate fails, and terminating the examination of the signature and structure.

5. The method as claimed in claim 2 or claim 4 wherein the step of terminating the examination of the signature and structure comprises the step of flagging a shared memory location within a computer processor so as to effect a marking within the shared memory location that the examination of the signature has failed.

6. The method as claimed in any preceding claim 1 wherein the step of examining the document structure comprises the steps of: a) determining if the document is structurally valid, and b) determining if the document is syntactically valid.

7. The method as claimed in claim 6 wherein the step of determining if the document is structurally valid comprises the steps of: a) extracting information from the document relating to the structure of the document, b) comparing the extracted information against a series of stored rules so as to determine whether the extracted information matches the stored information, and c) on determining that the extracted information matches the stored information marking the document as structurally valid.

8. The method as claimed in claim 6 wherein the step of determining if the document is syntactically valid comprises the steps of: a) extracting information from the document relating to the syntax of the document, b) comparing the extracted information against a series of stored rules so as to determine whether the extracted information matches the stored information, and c) on determining that the extracted information matches the stored information marking the document as syntactically valid.

9. The method as claimed in claim 7 wherein on determining that the document is not structurally valid comprises the performing the additional step of: a) flagging a shared memory location with a marker so as to identify that the structure has been found invalid.

10. The method as claimed in claim 8 wherein on determining that the document is not syntactically valid comprises performing the additional step of: a) flagging a shared memory location with a marker so as to identify that the syntax has been found invalid.

11. The method as claimed in claim 9 wherein the marking of the shared memory location with a marker so as to identify that the structure has been found invalid effects a termination of the examination of the digital signature and the document structure.

12. The method as claimed in claim 10 wherein the marking of the shared memory location with a marker so as to identify that the syntax has been found invalid effects a termination of the examination of the digital signature and the document structure.

13. The method as claimed in claim 1 wherein a shared memory location is accessed during both of the steps of examining the signature and examining the document structure, the noting of a marked failure within the shared memory effecting a termination of the examination of the signature or the document structure.

14. The method as claimed in claim 13 wherein the noting of a marked failure within the shared memory location is effected by incrementing or decrementing a value stored within the shared memory location, and on accessing the shared memory location any deviation between the actual value measured at the shared memory location and a previously measured value results in a termination of the examination of the signature or the document structure.

15. The method as claimed in claim 1 wherein the steps of examining the document signature and the document structure are conducted as multiple threads within the same process.

16. A computer system adapted for the concurrent processing of digitally signed document, the system comprising: a) a signature verification module adapted to verify the signature associated with a document, b) a document structure verification module adapted to verify the structure of a document, c) a state processor, and wherein both the signature verification module and the document structure verification module interface with the state processor during verification of the signature and verification of the document structure, and wherein the state processor is adapted in response to a verification failure of either the signature or structure to flag the failure and wherein the signature verification module and the document structure verification module are adapted to terminate verification upon detection of the failure flag arising from the failure of the other verification process.

* * * * *